US012568071B2

(12) United States Patent
Parkinson et al.

(10) Patent No.: US 12,568,071 B2
(45) **Date of Patent: \*Mar. 3, 2026**

(54) SAFE LOGON

(71) Applicant: Allstate Insurance Company,
Northbrook, IL (US)

(72) Inventors: John Parkinson, Burlington, VT (US);
David Harris, Wheaton, IL (US);
Mark D. Hansen, Greensboro, NC
(US); Nicolette De Guia, Chicago, IL
(US)

(73) Assignee: Allstate Insurance Company,
Northbrook, IL (US)

( * ) Notice: Subject to any disclaimer, the term of this
patent is extended or adjusted under 35
U.S.C. 154(b) by 110 days.

This patent is subject to a terminal dis-
claimer.

(21) Appl. No.: 18/431,039

(22) Filed: Feb. 2, 2024

(65) Prior Publication Data

US 2024/0259365 A1 Aug. 1, 2024

Related U.S. Application Data

(63) Continuation of application No. 17/519,049, filed on
Nov. 4, 2021, now Pat. No. 11,924,191, which is a
continuation of application No. 16/519,874, filed on
Jul. 23, 2019, now Pat. No. 11,196,734.

(51) Int. Cl.
*H04L 9/40* (2022.01)

(52) U.S. Cl.
CPC ...... *H04L 63/0815* (2013.01); *H04L 63/0807*
(2013.01); *H04L 63/0853* (2013.01)

(58) Field of Classification Search
CPC ............. H04L 63/0815; H04L 63/0807; H04L
63/0853; H04L 2209/42; H04L 2209/56;
H04L 9/3213; H04L 9/40; H04L 63/168;
H04L 63/0869; G06Q 30/0609
See application file for complete search history.

(56) References Cited

U.S. PATENT DOCUMENTS

| | | | |
|---|---|---|---|
| 7,478,157 B2 | 1/2009 | Bohrer et al. | |
| 9,615,192 B2 | 4/2017 | Raleigh | |
| 10,891,372 B1 | 1/2021 | Shahbazi | |
| 2005/0102195 A1* | 5/2005 | Kuehr-McLaren | G06Q 50/188 |
| | | | 705/26.2 |
| 2008/0289020 A1* | 11/2008 | Cameron | H04L 9/3247 |
| | | | 726/9 |
| 2009/0119182 A1* | 5/2009 | Krstulich | G06Q 30/0601 |
| | | | 705/64 |

(Continued)

OTHER PUBLICATIONS

Ranchal et al., Epics: A framework for enforcing security policies in
composite web services, IEEE Transactions on Services Computing
12.3, pp. 415-428 (2018).

(Continued)

*Primary Examiner* — Henry Tsang
(74) *Attorney, Agent, or Firm* — Akerman LLP

(57) ABSTRACT

Methods, computer-readable media, software, and appara-
tuses are provided to assist a user and vendor in completing
an online trusted transaction. Trusted vendor websites are
verified and user identities are confirmed through a cyber-
security safe logon credentialing system. The vendor can be
confident that the user identity has been verified to be who
they say they are and the user can be confident that they are
using a trusted verified vendor website.

20 Claims, 6 Drawing Sheets

(56)          References Cited

U.S. PATENT DOCUMENTS

| 2013/0276087 | A1* | 10/2013 | Bjones ................ H04L 63/0407 |
| | | | 726/9 |
| 2014/0344153 | A1 | 11/2014 | Raj et al. |
| 2016/0162875 | A1 | 6/2016 | Desoto et al. |
| 2017/0163617 | A1 | 6/2017 | Laxminarayanan et al. |
| 2017/0193624 | A1* | 7/2017 | Tsai ....................... G06Q 50/01 |
| 2019/0158487 | A1 | 5/2019 | Hayes et al. |
| 2021/0014218 | A1 | 1/2021 | Kurylko |

OTHER PUBLICATIONS

International Search Report and Written Opinion, PCT/US2020/041431, Sep. 28, 2020.

* cited by examiner

SAFE LOGON

CROSS-REFERENCE TO RELATED APPLICATIONS

This application is a continuation of U.S. application Ser. No. 17/519,049, filed Nov. 4, 2021, which is a continuation of U.S. application Ser. No. 16/519,874 filed Jul. 23, 2019, now U.S. Pat. No. 11,196,734 issued Dec. 7, 2021 the disclosure of which is hereby incorporated in its entirety by reference herein.

FIELD OF ART

Aspects of the disclosure generally relate to methods and computer systems, including one or more computers particularly configured and/or executing computer software. More specifically, aspects of this disclosure relate to methods and systems for enabling users and vendors to transact in a confident manner in which a user's identity is verified and the vendor has been vetted.

BACKGROUND

Protecting confidential information in today's online environment is difficult due to the increased connectivity and the increased number of user accounts accessible via web enabled computing devices. Creating mutual trust between a user and a vendor through use of a website or mobile application requires that the user trust the operating policies and data use and sharing practices of the site or application and the site trusts the user's identity. This is challenging in the digital dimension, when the two entities may never meet and must depend on an exchange of information, third party verification services, and multi-factor authentication mechanisms.

Current methods and systems of authenticating users may expose a user's credentials or use arbitrary credentialing semantics which are not preferred by vendors. These existing methods and systems for exchanging information between users and vendors introduce friction into the process of using a vendor's website or mobile application for purchases through third party verification services.

Therefore, there is a desire for a system that implements a more convenient mechanism to identify trusted sites combined with a mechanism to reliably confirm a user's identity that establishes and enhances mutual trust while reducing friction.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses to perform a trusted online transaction between a user and a vendor. A user can trust that a site using the safe logon button is a trusted site that has been verified and audited to ensure that its policies and practices meet minimum standards for privacy, data sharing, and compliance. A vendor can trust that the system has verified the identity of the user.

In addition, the system compares a user's privacy preference with a privacy policy of a vendor and, in some embodiments, to recommend alternative vendors having privacy policies more closely matching the user's privacy preferences. The recommended alternative vendors may be output for display to the user along with indications of various qualities of the vendors' privacy policies, and indications of how, or if, those qualities conform to, or lack conformance with, the user's privacy preferences. The described cyber-security system may help a user avoid interacting with vendors having privacy policies that don't match the user's preferences, and may help the user find other vendors whose privacy policies more closely match their privacy preferences.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for matching user privacy preferences with corporate online personal data practices. A vendor, also referred to herein as an entity or vendor, may maintain a privacy policy that describes how a user's personal data is collected and shared, whether a user can opt in/out of the collection of data, and/or whether a user can delete the collected personal data, for example. Personal data may include information such as the user's name, address, age, telephone number, email address, and products/services searched for, among others.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

By creating a service that implements a more convenient mechanism to identify trusted sites, and offer alternatives if needed, combined with a mechanism to reliably confirm a user's identity, the system establishes and enhances mutual trust while reducing friction. In an embodiment, during the logon process, a user's security may be enhanced because actual credentials are never directly exposed. In addition, site security may also be protected because user identities are verified.

In an aspect of the disclosure, a cyber-security system described below provides for onboarding of vendors and identity verification of users. In an embodiment, the cyber-security system may offer a warranty or indemnification in the event that either party is impacted by any of a predefined list of platform failure events.

In another aspect of the disclosure, cyber-security system may further allow a site to specify what credentials are required, avoiding the complications or arbitrary credential semantics. Furthermore, cyber-security system may allow a user to specify, via a profile and preferences, data items should be shared for each site that uses the cyber-security system. In an embodiment, where a site's practices do not closely match a user's preferences, alternative sites that offer a better match may be presented.

Figure 1:
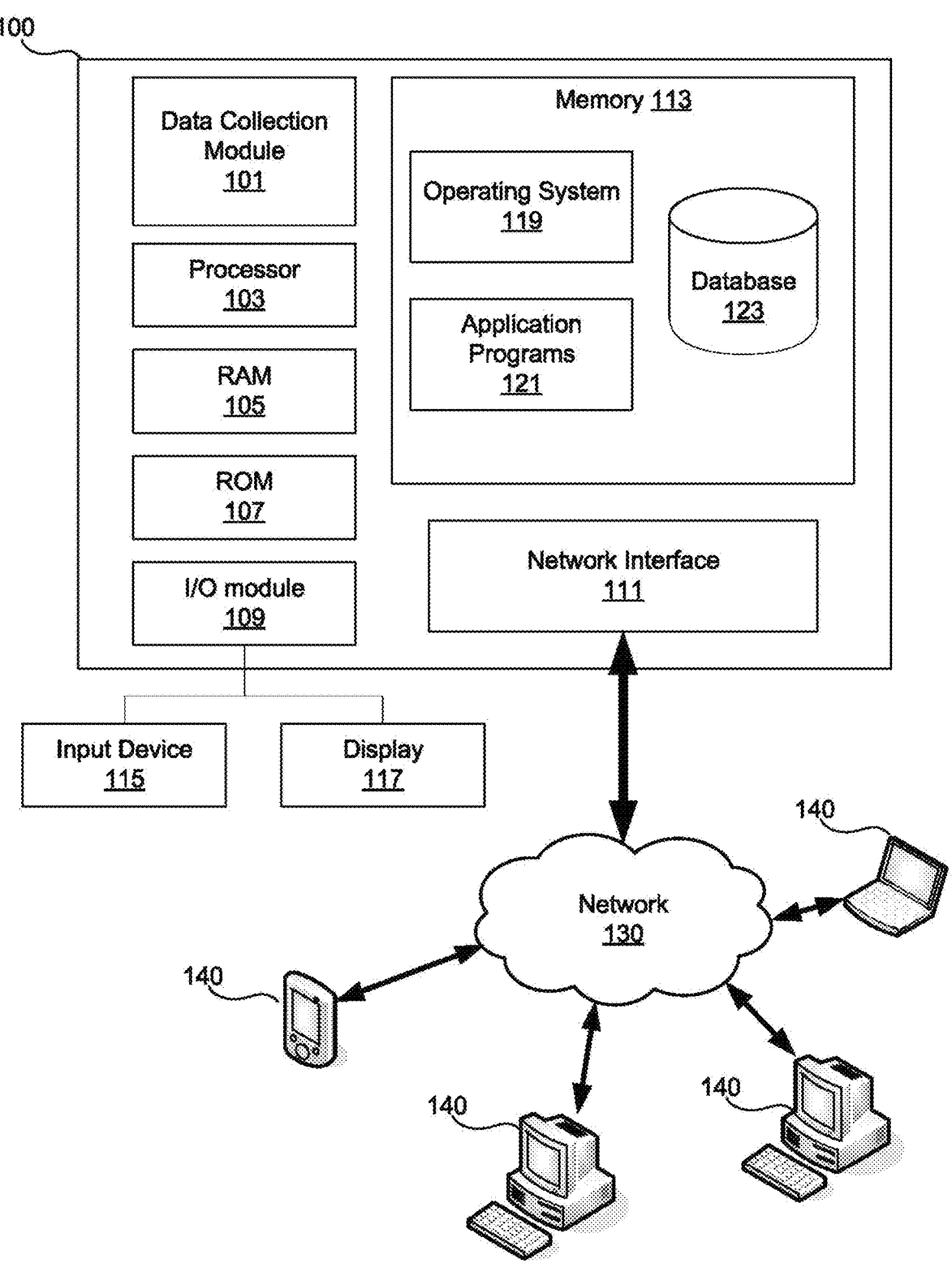
FIG. 1 illustrates an example cyber-security device that may be used in accordance with one or more aspects described herein.

In one or more arrangements, aspects of the present disclosure may be implemented with a computing device. FIG. 1 illustrates a block diagram of an example cyber-security device 100 that may be used in accordance with aspects described herein. The cyber-security device 100 may be a computing device, such as a personal computer (e.g., a desktop computer), server, laptop computer, notebook, tablet, smartphone, vehicles, home management devices, home security devices, smart appliances, etc. The cyber-security device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, cyber-security device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the cyber-security device 100 and its associated components, including RAM 105, ROM 107, an input/output (I/O) module 109, a network interface 111, and memory 113. For example, the data collection module 101 and processor(s)

103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the cyber-security device 100 may provide input data. The I/O module 109 may also be configured to be connected to a display device 117, such as a monitor, television, touchscreen, etc., and may include a graphics card. The display device 117 and input device 115 are shown as separate elements from the cyber-security device 100; however, they may be within the same structure. On some cyber-security devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the cyber-security device 100 to perform various functions. For example, memory 113 may store software used by the cyber-security device 100, such as an operating system 119 and application programs 121, and may include an associated database 123.

The network interface 111 may allow the cyber-security device 100 to connect to and communicate with a network 130. The network 130 may be any type of network, including a local area network (LAN) and/or a wide area network (WAN), such as the Internet, a cellular network, or a satellite network. Through the network 130, the cyber-security device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as cyber-security device 100. In some embodiments the cyber-security device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
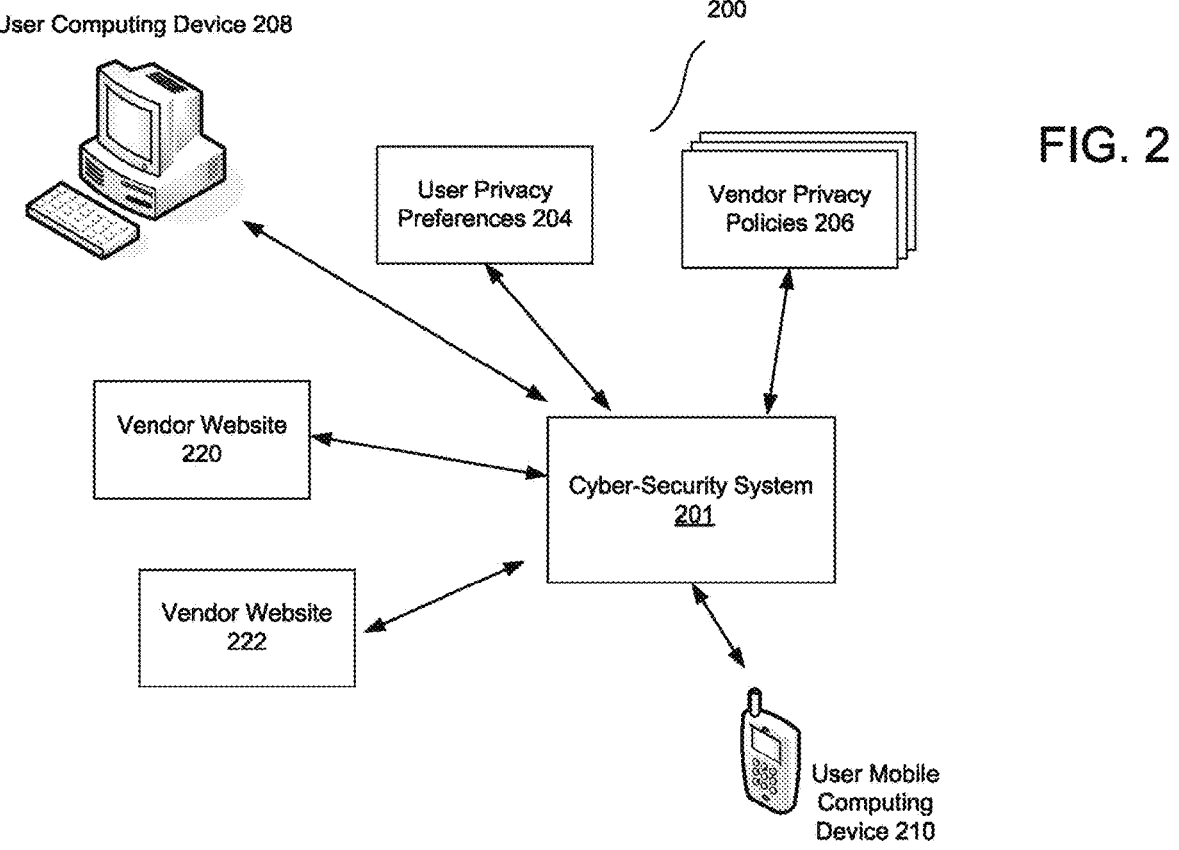
FIG. 2 shows a diagram illustrating system architecture for a cyber-security system in accordance with one or more aspects described herein.

FIG. 2 shows a block diagram illustrating system architecture 200 for a cyber-security system 201. In some embodiments, cyber-security system 201 may be implemented as part of a proxy server. In some other embodiments, cyber-security system 201 may be implemented in a virtual private network (VPN) end point. In some embodiments, cyber-security system 201 may be implemented as part of a cyber-security platform or as part of a digital safety framework. In some instances, cyber-security system 201 may be a cyber-security device 100.

In an embodiment, cyber-security system 201 may collect information from, and transmit information to, a user through various different channels, such as via a user mobile computing device 210, or via a user computing device 208. In some embodiments, cyber-security system 201 may receive a request from a user to purchase a product or service and may transmit the request to a vendor identified by the request. For example, a user may use a web browser, or other application, on user computing device 208 to send a request to cyber-security system 201 to purchase a product or service offered at vendor website 220. In some embodiments, the request may include a Uniform Resource Locator (URL) identifying the vendor website 220. In some embodiments, the request may include a request for content, such as a request for a web page comprising hypertext markup language (HTML), such as a website's home page. Upon receiving the request, cyber-security system 201 may compare the user privacy preferences 204 with vendor privacy policies 206, which may include a privacy policy associated with the vendor website 220.

The user privacy preferences 204 may represent the privacy preferences of the user who sent the request. In some embodiments, the user privacy preferences 204 may be associated with the computing device sending the request, for example, user computing device 208. In some embodiments, the user privacy preferences 204 may have been previously stored by cyber-security system 201, for example, in a local database. In other embodiments, the user privacy preferences 204 may be received by cyber-security system 201 as part of the request sent by the user. In still other embodiments, cyber-security system 201 may retrieve the user privacy preferences 204 from a computing device via a network, for example, after receiving the request from the user. In some embodiments, cyber-security system 201 may be configured with artificial-intelligence capabilities to understand a user's preference based on user's usage over time.

In an aspect of the disclosure, vendor privacy policies 206 may include privacy policies of one or more vendors. As noted above, vendor privacy policies 206 may include the privacy policy associated with the vendor website 220. For example, the privacy policy associated with the vendor website 220 may have been previously stored by the cyber-security system 201, for example, in a local database. In some other embodiments, the privacy policy associated with the vendor website 220 may be retrieved from the vendor website 220, or from another location, for example, after receiving the request from the user. In various embodiments, the cyber-security system 201 may process or translate one or more vendor privacy policy into an internal format appropriate for comparing with the user's privacy preferences.

Upon determining that the privacy policy associated with the vendor website 220 matches, or is otherwise compatible with, the user privacy preferences 204, cyber-security system 201 may attempt to login the user with the vendor website using a safe logon process.

Alternatively, the cyber-security system 201 may determine that the vendor privacy policy associated with the vendor website 220 does not match, or is not compatible with, the user privacy preferences 204, and if so, the cyber-security system 201 may respond to the request from the user by providing various indications to that effect. For example, the cyber-security system 201 may respond with an indication that the vendor privacy policy 206 associated with the vendor website 220 does not match the privacy preferences 204. The indication may include visual or audio indications, such as a warning message or symbol, for example.

In some embodiments, the cyber-security system 201 may determine one or more alternative vendors, such as vendor website 222, who may offer a similar product or service and, in these embodiments, the cyber-security system 201 may respond with indications of the alternative vendors. For example, the response may include information, which when displayed, provides visual indications of the alternative vendors. In some embodiments, the visual indications may include indications as to how closely the privacy policies of one or more alternative vendors matches the user privacy preferences 204.

In some embodiments, after responding with the indications of the alternative vendors, the cyber-security system 201 may receive a request from the user indicative of a selection of one of the alternative vendors. The cyber-security system 201 may subsequently attempt to logon the user with the alternative vendor through a safe logon process.

In some embodiments, the user privacy preferences 204 may include information related to one or more privacy categories. The vendor privacy policies 206 may be compared to the user privacy preferences 204 by comparing information in each of the privacy categories. In some embodiments, the privacy categories may include categories generally related to data collection, data usage and data management. As an example, the user privacy preferences 204 may indicate that the user doesn't want collected personal data to be shared by the vendor. In another example, the user privacy preferences 204 may indicate that the user wants to be able to delete collected personal data stored by the vendor. In still another example, the user privacy preferences 204 may indicate that the user wants to be able to opt in, or opt out of, having their personal data collected by the vendor. The vendor privacy policy 206 may include information indicating the vendor's policy related to one or more of these privacy categories.

In order to be able to offer alternative vendors in response to a user's request, the cyber-security system 201 may store information of various vendors, their products, or services offered, and their privacy policies. In some embodiments, the information may be organized by product or service offered, in order to enable the cyber-security system 201 to identify vendors who may provide a product or service similar to one included in a request from a user. While this may represent one method for associating the vendor included in the user's request with alternative vendors, it should be understood that other methods may be used to accomplish the association. In some embodiments, the information may be stored in a database accessible by the cyber-security system 201.

In some embodiments, a database may be manually created, for example, and include information about larger or more popular retailers and their privacy policies. In other embodiments, the database may be constructed by automated means, for example, by scraping vendor websites to obtain privacy policies and information about products and services offered.

In some embodiments, information from vendor privacy policies may be processed to translate privacy policies of various vendors into a common ontology or vocabulary in order to facilitate comparing and interpreting the policies. In some embodiments, the cyber-security system 201 may include an ontology that organizes websites with similar purposes according to characteristics derived from privacy policies covering personal data items collected, permissible use for those data items, opt in and opt out options.

In each collection of similar websites or similar capabilities, websites may be ranked according to their privacy practices, for example, from most private to least private. Various definitions of the ranking process, which may have several dimensions, may be used. In some embodiments, the definitions may be adjusted as privacy practices evolve. Initial definitions may include, but are not limited to: type/amount of data collected, a measure of extent of data sharing with third parties, a measure of the extent of monetization of users' data for any purpose, a measure of the difficulty for a user to opt in or out of data collection and data use, and a measure of the case of deletion of data at a user's request.

In some embodiments, the cyber-security system 201 may store a user profile for one or more users that includes the users' privacy preferences. In these embodiments, the cyber-security system 201 may keep an account for each user and may identify the user when the user logs in or submits other identifying information. In other embodiments, the user privacy preferences may be received by the cyber-security system 201 when a user sends a request for a product or service. In such embodiments, the cyber-security system 201 may not need to maintain an account for each user.

In some embodiments, the cyber-security system 201 may output, for display to a user, an indication of the match between a website's privacy policy and the user's privacy preferences. In some other embodiments, cyber-security system 201 may generate a visualization of alternative websites that are better matches with the user's privacy preferences. In some embodiments, the visualization may be generated using a variety of weighting algorithms and strength of match variables. In some embodiments, the visualization may place the user at the center of a circle or globe and may use distance from the center, spatial orientation, and/or color to indicate the closeness of the match between the user's privacy preferences and the website's privacy policy.

In some embodiments, the cyber-security system 201 may track a user's online communications with various websites over time, for example, in order to gather a user's digital footprint. In some embodiments, the cyber-security system 201 may perform an analysis on the gathered digital footprint to assess alignment between the associated vendor privacy practices and a user's privacy preferences. In some embodiments, the analysis may be triggered based on a change in a user's privacy preferences. In other embodiments, the analysis may be triggered by a request, from a user, to do so. In some other embodiments, the analysis may be triggered based on an elapsed time since a previous analysis was performed. In some other embodiments, the analysis may be triggered by a change in one or more vendor privacy practices.

Figure 3:
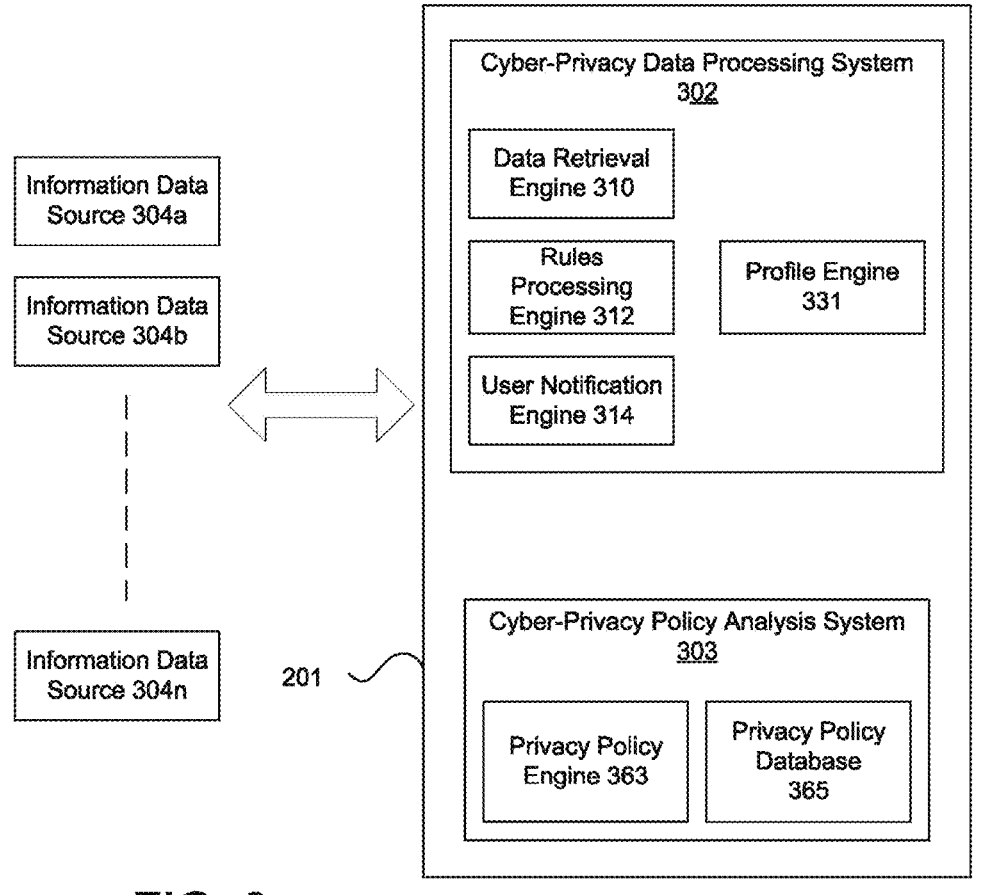
FIG. 3 illustrates a block diagram of particular portions of a cyber-security system in accordance with one or more aspects described herein.

FIG. 3 illustrates a block diagram of particular portions of a cyber-security system 201. As shown in FIG. 3, the cyber-security system 201 may communicate with a plurality of information data sources 304a, 304b . . . 304n to collect information related to products and services offered by various vendors, and to collect information related to the privacy policies of the various vendors. In some embodiments, the information data sources 304a, 304b . . . 304n may include vendor website 220 and vendor website 222, illustrated in FIG. 2.

In some embodiments, the cyber-security system 201 may comprise a cyber-security data processing system 302 and a cyber-security privacy policy analysis system 303. The cyber-security data processing system 302 may retrieve information from the plurality of information data sources 304a-304n in order to determine the privacy policies of various vendors. The data retrieval engine 310 may be configured to monitor (for example, continuously monitor) each of the information data sources 304a-304n and report data of interest from any one of these data sources to the cyber-security system 201. For example, the data retrieval engine 310 may monitor a vendor website to determine if a privacy policy has changed. If a change is detected, the rules processing engine 312 may determine that related information should be passed on to the cyber-security policy analysis system 303 for analysis. In an embodiment, the cyber-security system may collect privacy policies from vendors that have been, or may be, utilized by users. In some embodiments, the user notification engine 314 may notify a user of a change in a privacy policy.

In an embodiment, cyber-security data processing system 302 may generate a user profile at profile engine 331. The user profile may be generated using at least in part data received and/or collected from information data sources 304a-304n. The user profile may include details of the user, including but not limited to a user's name, age, address, driver's license number, credit card or bank information, insurance policies, networked devices associated with the user, and privacy preferences, etc. In an embodiment, the user may themselves enter additional or confirm information found in their user profile through a mobile application or computing device interface. Additional information that may be entered by the user includes financial account details and or verification of online accounts used by a user.

Privacy policies from numerous vendors may be fed into privacy policy engine 363 to determine information such as 1) what information is being collected from a user, 2) what the information of the user will be used for, and 3) whether the vendor will make the information available to third parties. Additional information that may be determined from the analyzed privacy policy may include, but is not limited to, user's rights and choices to access the data and make corrections or deletions, rights or choices regarding data collection, how cookies are used, an organization's contact information, and the effective date of the policy. In some embodiments, the machine-learning algorithm may be trained based on a number of human-classified privacy policies.

In an embodiment, privacy policy engine 363 may include a conical data model and a supervised machine learning model for analyzing privacy policies. For instance, exemplary privacy policies may be tagged and used to build a classifier for analyzing subsequent privacy policies as typical privacy policies include sections of information discussing the various types of information being collected from a user, how such information may be used, and whether third parties will have access to the collected information. The added metadata to the exemplary privacy policies may be used by privacy policy engine 363 to identify information of interest in additional scanned privacy policies. In an embodiment, the output of privacy policy engine 363 may be stored in privacy policy database 365.

In an embodiment, privacy policy engine 363 may adjust the tagging scheme based on the accuracy of the results and the variability of the terminology used in different privacy policies. In another embodiment, privacy policy engine 363 may be used with different languages other than English.

In an embodiment, cyber-security privacy policy engine 363 may compare privacy policies of similar classifications of vendors (for example, vendors selling shoes, or vendors selling clothing, or vendors selling groceries). Such analysis may result in faster processing times of additional privacy policies, and may flag new additional provisions to be tagged. In an embodiment, additional information that privacy policy engine 363 may determine include data security information, compliance information, data retention information, and user control information.

In another embodiment, if privacy policy engine 363 does not find any data of interest in a privacy policy, a flag be set for further review of the privacy policy. The flag may be stored in privacy policy database 365.

As discussed above, the privacy policy of a vendor may include policies related to several privacy categories. For example, a privacy policy may include a category related to the type of data collected, a category related to opt in/opt out policies, a category related to data deletion practices, and a category related to data sharing practices.

In some embodiments, the cyber-security system 201 may determine risk information (for example, a value and/or the information from which the value is derived) based on a user's privacy preferences and, in some embodiments, based on their actions taken when their privacy preferences do not match with a vendor's privacy policy.

A marketplace may be established for buying and selling risk information. For instance, an insurance marketplace may allow insurance providers to access risk information from the cyber-security system 201. Insurance providers and/or underwriters may establish insurance policies based on the risk information. For example, an insurance provider may offer an insurance policy to the user that protects against fraudulent transactions based on the risk information. If a user incurs financial damage as a result of a data breach (for example, the user is subjected to credit card fraud), the insurance policy may compensate the user for some or all financial losses incurred.

Premiums and/or deductibles for insurance policies may be established based on the risk information and/or value associated with a user. For example, a user with a high value may be charged a higher premium than a user with a low value.

In some instances, the risk information may be collected and used to determine behavioral patterns for a class of user. Over time, the cyber-security system 201 may determine the behavioral patterns based on actions taken by a user. For example, the cyber-security system 201 may determine that a user usually ignores the alternative vendors and continues to interact with a vendor having a privacy policy that does not match the user's privacy preferences.

In some instances, the determined, resultant behavioral data representing the behavioral patterns and/or the data used to determine behavioral patterns may be made available through the marketplace. A database of patterns may be made available detailing the risks associated with given behaviors. An insurer may pay to have access to a marketplace of the data, in order to better tailor insurance products for a user based on associated risk.

In some instances, access to the marketplace may be restricted and/or incur a fee. For example, a fee may be charged to access risk information collected by the cyber-security system 201. In some instances, the cyber-security system 201 may collect information from a variety of sources (e.g., credit monitoring services, identity theft protection services, user information protection services, etc.), and store the combined information in a database. In some instances, a separate fee may be charged for access to only a subset of the database information.

In an aspect of the disclosure, a cyber-security system 201 may be configured to, in operation, analyze the privacy policy for each institution, business, and/or vendor associated with a user determined from an email scan, browser history, and/or browser cache search. The cyber-security system may also analyze the on-line privacy policies of financial institutions and other businesses for which the user has an account based on information provided by an analysis of the user's profile. The determined information may be displayed to the user along with recommendations regarding personal data safety.

In an embodiment, a user device, such as user computing device 208, may include an application or a browser plugin, for example, that communicates with cyber-security system 201 to evaluate the privacy policy of a vendor before sending a request directly to the vendor website.

Figure 4:
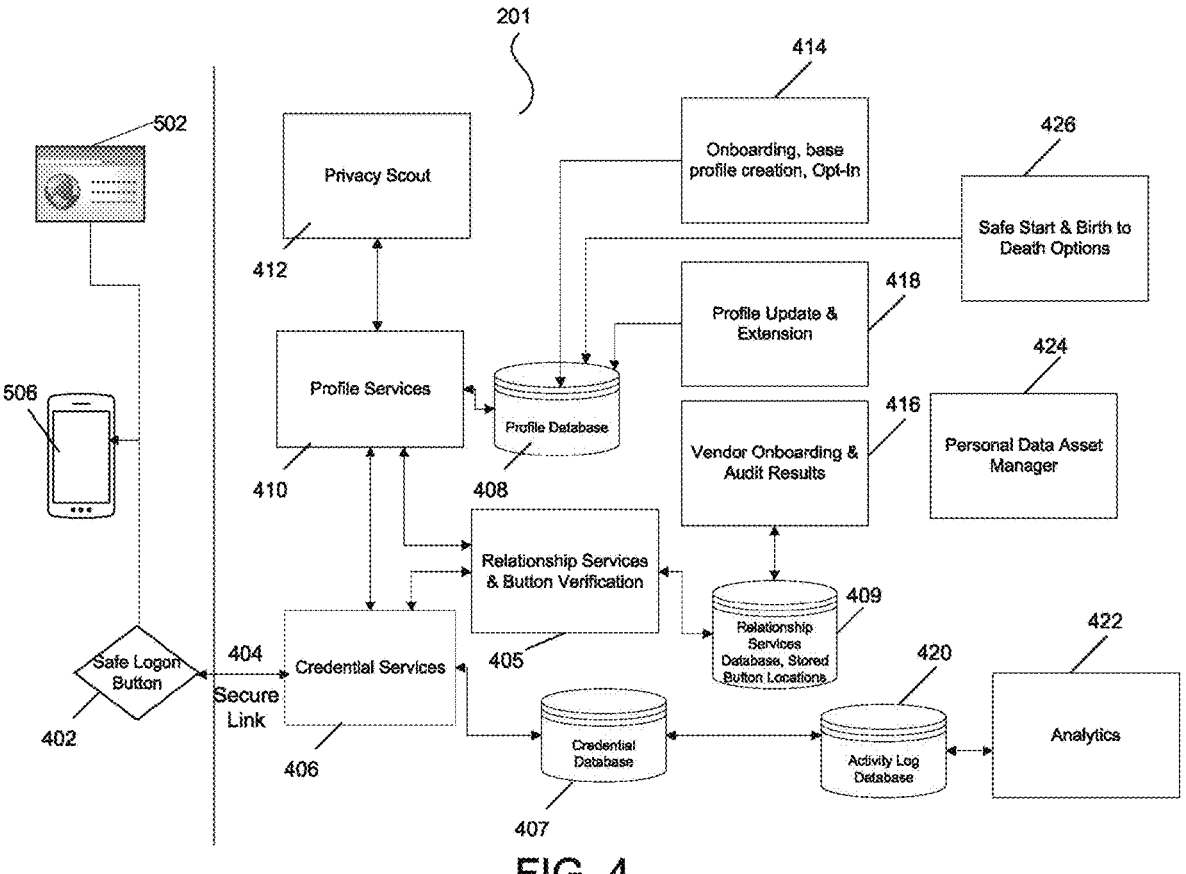
FIG. 4 illustrates additional system architecture for a cyber-security system in accordance with one or more aspects described herein.

FIG. 4 illustrates a block diagram of additional portions of cyber-security system 201 used to verify users' identities and identify trusted vendors' websites. In an aspect of the disclosure, cyber-security system 201 may provide a safe logon button such as safe logon button 402. In an embodiment, safe logon button 402 may be displayed on a vendor's website or on a vendor's mobile application.

Figure 5:
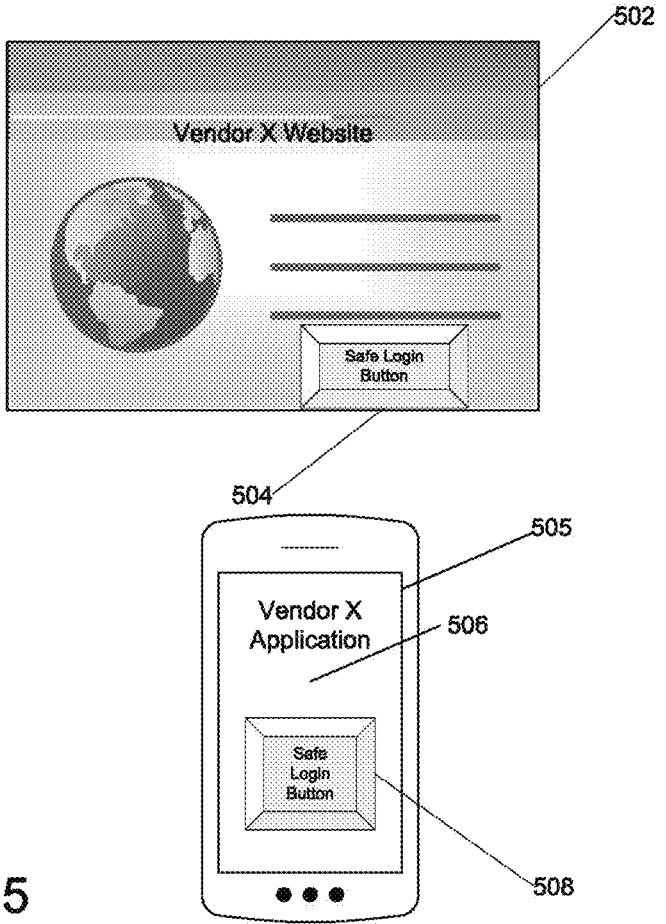
FIG. 5 illustrates exemplary user interfaces in accordance with one or more aspects described herein.

FIG. 5 illustrates user interfaces in accordance with one or more aspects of the disclosure. For example, FIG. 5 illustrates a logon or purchasing screen for vendor X's website at 502. As shown, a safe logon button 504 may be displayed to a user for use in safely transacting with vendor X. The transaction may be a purchase of a jersey or other apparel item displayed for sale on vendor X's website. Use of cyber-security system 201 and safe login button 504, simplifies the credentialing and identity verification processes for both vendor X and the user. The user can trust that vendor X's website has been audited by cyber-security system 201 and that its policies and practices meet minimum standards for privacy, data sharing, and compliance. Also, vendor X can trust that the user's identity has been verified for the purchase or transaction. In an embodiment, use of cyber-security system 201 and safe login button 504 reduces fraud by ensuring user identities are real, verified, and are not synthetic.

Similarly, a logon or purchasing screen for vendor X's website may be displayed on a mobile device's display 506. For instance, a user interface such as user interface 506 may display a safe logon button such as safe logon button 508 for use in safely transacting with vendor X via the user's mobile phone 505.

Returning to FIG. 4, the safe logon button 402 when selected may initiate a safe logon process. For instance, the safe logon button 402 may provide a secure link 404 to credentialing services 406. In an embodiment, secure link 404 may be a connection via the Internet using an IPSec VPN, SSL/TLS or equivalent protocol. In an embodiment, and for security processes, the safe logon button 402 and associated embedded code may be signed with a code signing security certificate.

In an aspect of the disclosure, credentialing services 406 may transmit tokenized credentials specific to the website or application the safe logon button 402 is implemented on. In an embodiment, credentialing services 406 may receive credentials from relationship services 405. In some embodiments, the credential exchange may require from zero to n additional factors for authentication depending on the context. In an embodiment, relationship services 405 may manage the vendors' sites profiles, credential requirements for each of the vendors, operational policies, data use and privacy practices, and reputation scores for the vendors.

In an aspect of the disclosure, tokens may be generated from user profile data items and may only be decrypted by the safe logon button 402 using a key. In an embodiment, a one-way hash value may be utilized.

In an aspect of the disclosure, cyber-security system 201 may store the generated tokens that represent a user's credentials for each site they visit via the button in credential database 407. In an embodiment, each website can have different credential requirements. Tokens may be generated from the site's requested data items such as user ID and password which are collected at an initial onboarding and mapped to the site.

In another aspect of the disclosure, credential services 406 may verify that the requesting website has a genuine safe logon button by looking in the relationship services database 409 and matching the code signing certificate key. In an embodiment, vendor websites may elect to use the generated token as a verified credential, in which case updates to user profile data can be pushed automatically to the vendor site and the token value updated. In an embodiment, relationship services database 409 may hold data that defines a vendor's site and mobile application's profile and credentialing requirements. In addition, relationship services database 409 may also store the vendor websites safe logon button code verification key. In an embodiment, the safe logon button 402 may decode the received token to provide the required logon credentials for the website.

In another aspect of the disclosure, cyber-security system 201 may support a link to onboarding for new users who encounter a safe logon button on a vendor website but do not yet have a profile established or may have a profile but are not yet registered on the vendor's site.

In an embodiment, use of a safe logon button such as safe logon button 402 by an unknown user may initiate a sign-up process. For instance, credentialing services 406 may determine that the user is a new user using a combination of device signature, fingerprinting, and/or responses to a short question and answer sequence. In an embodiment, a user's profile may be generated incrementally via an extended conversational interaction. Users may elect to create a complete profile at initial onboarding but may also create a partial profile that can be added to later. Users with partial profiles may be prompted periodically to add more profile data to unlock additional value from the safe logon services. In an embodiment, the created user profile may be stored in profile database 408. In an embodiment, profile database 408 may hold the data that defines a user's preferences for data use and sharing. Profile database 408 may also record opt-in and opt-out decisions for data use at each website. Finally, profile database 408 may also store complete profile data.

For instance, a user may define for each website or category of websites what information they are willing to share with vendors of such websites. If a vendor's website requires additional information beyond what a user is willing to share, cyber-security system 201 may propose alternative websites to users which are in line with the information they are willing to share. In an embodiment, cyber-security system 201 may also provide vendors with information as to which information types users are not willing to share so that they can reconsider their requirements. For instance, a user may not be willing to share their birthdate but may be willing to share their age.

In another embodiment, if a user does not define any data usage or data sharing preferences, cyber-security system 201 may warn a user to set such preferences and may default a user to only transact with verified safe websites until such information has been acknowledged or received.

In order to verify a user's identity, cyber-security system 201 may request that a user provide unique verifiable personal identifiable information, possibly including biometrics if the sign-up device has biometric recording capability, to create a trusted identity. In another embodiment, cyber-security system 201 may allow a user to provide less personal identifiable information as long as the user accepts incremental service capabilities that uses accumulated device reputation, geolocation, and behavioral data to create a trusted identity.

In an aspect of the disclosure and with user permission, a user may allow cyber-security system 201 to use existing database information regarding the user cyber-security system may already have due to earlier existing accounts or relationships with the provider of cyber-security system 201. In an embodiment, the use of such data may reduce the amount of additional information a user may have to supply to cyber-security system 201.

In an embodiment, cyber-security system 201 may in order to verify a user's identity provide the user with a series of behavioral questions to be answered in order to map a personality profile score that is used to create an initial level of trust for the identity. In another embodiment, in order to verify a user's identity, cyber-security system 201 may allow a user to share information from an existing profile on another site including social media sites. In this embodiment, cyber-security system 201 may use a risk adjusted score to assess the reliability of the information being shared.

In an aspect of the disclosure, a complete user profile may include opt-in elections for the use of all data items in the user profile. As the user elects to use the safe logon button service for new sites and that election adds new data item requirements to the user profile, the user may be prompted by cyber-security system 201 to make additional opt-in choices for the new items. In an embodiment, credentialing services 406 may allow a user to select a no sharing or partial sharing of certain personal information as an election.

In an aspect of the disclosure, cyber-security system 201 may provide for a user to add to or modify their profile 418 and amend the user's opt-in data sharing decisions. Changes to profile data items that are used to generate site credential tokens may generate a warning that the user should update their registration details with the vendor or, where this is possible, trigger an update transaction of the vendor's site's data automatically.

In an embodiment, cyber-security system 201 may include profile services 410 for managing the mapping of user profile data items to opt-in use at specific vendor websites. In addition, profile services 410 may communicate with privacy scout 412 so that if a vendor's website does not match a user's preferences, alternative websites with improved matches can be identified and displayed to the user.

In an embodiment, credentialing services 406, may know what credentials are required for each vendor because of vendor pre-registering. Credentialing services 406 may ensure that the onboarding process creates the appropriate minimum initial profile or prompt the user to add new data items. If the user does not want to provide additional items, alternatives sites offering similar products or services may be provided to the user.

In an aspect of the disclosure, cyber-security system 201 may provide for vendor onboarding 416. In an embodiment, a vendor may register their website. The vendor provides verifiable basic profile information about the business and requests and agrees to an audit to verify their security, sign on, privacy and data use policies and practices. Vendors may also provide permission for cyber-security system 201 to perform a reputation check.

In an aspect of the disclosure, vendors that pass the audit and reputation check may be admitted as vendor members to the cyber-security logon service and can set up a profile that defines what sign on information is required. In an alternative, cyber-security system 201 may provide standard defaults for the vendor's use. The selection of this required information may be checked for consistency with data use and privacy policies and practices. If there are material differences the vendor may be blocked until the differences are resolved. Material differences may be acceptable but influence the alignment to user preferences for data use and privacy, which in turn may impact traffic flow from recommendations. In cases of extreme divergence, a vendor may be blocked from using the service.

Once this onboarding process has been completed, a custom logon button is created for the vendor and the associated code and content can be integrated by the vendor or their website provider into the logon page for their website or mobile application.

In an aspect of the disclosure, cyber-security system 201 also include user onboarding and verification 414. Cyber-security system 201 may create and verify an initial profile for a user, including a basic opt-in data item and use preferences for a user. Cyber-security system 201 may implement an incremental trust model within which behavior observed over time increases the strength of trust and opens additional capabilities to the user. An optional smart onboarding process may measure a new user's propensity to share information according to the questions they choose to answer.

In another aspect of the disclosure, cyber-security system 201 may provide for vendor onboarding and auditing 416. In an embodiment, cyber-security system 201 may utilize a vendor reputational rating system to assist in verifying vendors. In an embodiment, cyber-security system 201 may create, verify, and monitor a vendor website or mobile application's credential requirements and privacy practices. The onboarding process may also create a unique logon button widget for the vendor with a signed key.

In another aspect of the disclosure, an activity log 420 may record use of a site's safe logon button by a user and all user activity within a session on that site once authentication is complete. In one embodiment, user activity may be implemented on a blockchain.

Cyber-security system 201 may also include an analytics module 422 that mines activity log data for new product and service opportunities. The analytics module 422 may provide trend data on a per user basis and compare user activity and behavior profile trends with similar users. In an embodiment, users may be notified of unusual or out of pattern behaviors and activity. Analytic module 422 may transmit information to a personal digital asset management application 424 including trend and status data.

In an embodiment, personal digital asset management application 424 may provide users with a view of where their data is being used, what value their data creates for the vendor site, and options to amend or remove opt-in preferences. In an embodiment, a user may link their personal data to a marketplace or exchange.

Cyber-security system 201 may also include a safe start service 426 that may allow generation of a user profile record for a newborn enrolled in a safe start program. For instance, particular types of data, such as biometric data, may be required to be submitted within a threshold time of a child's birth. If the threshold is satisfied, a token may be determined and may be linked to the insurance product. A physical device storing the token may be provided to an intended recipient associated with the insurance product. When a payout of the insurance product is requested, the physical device storing the token may be provided and used to authenticate the identity of the person requesting the payout. In an embodiment, safe start service 426 may generate the newborn's profile.

Figure 6:
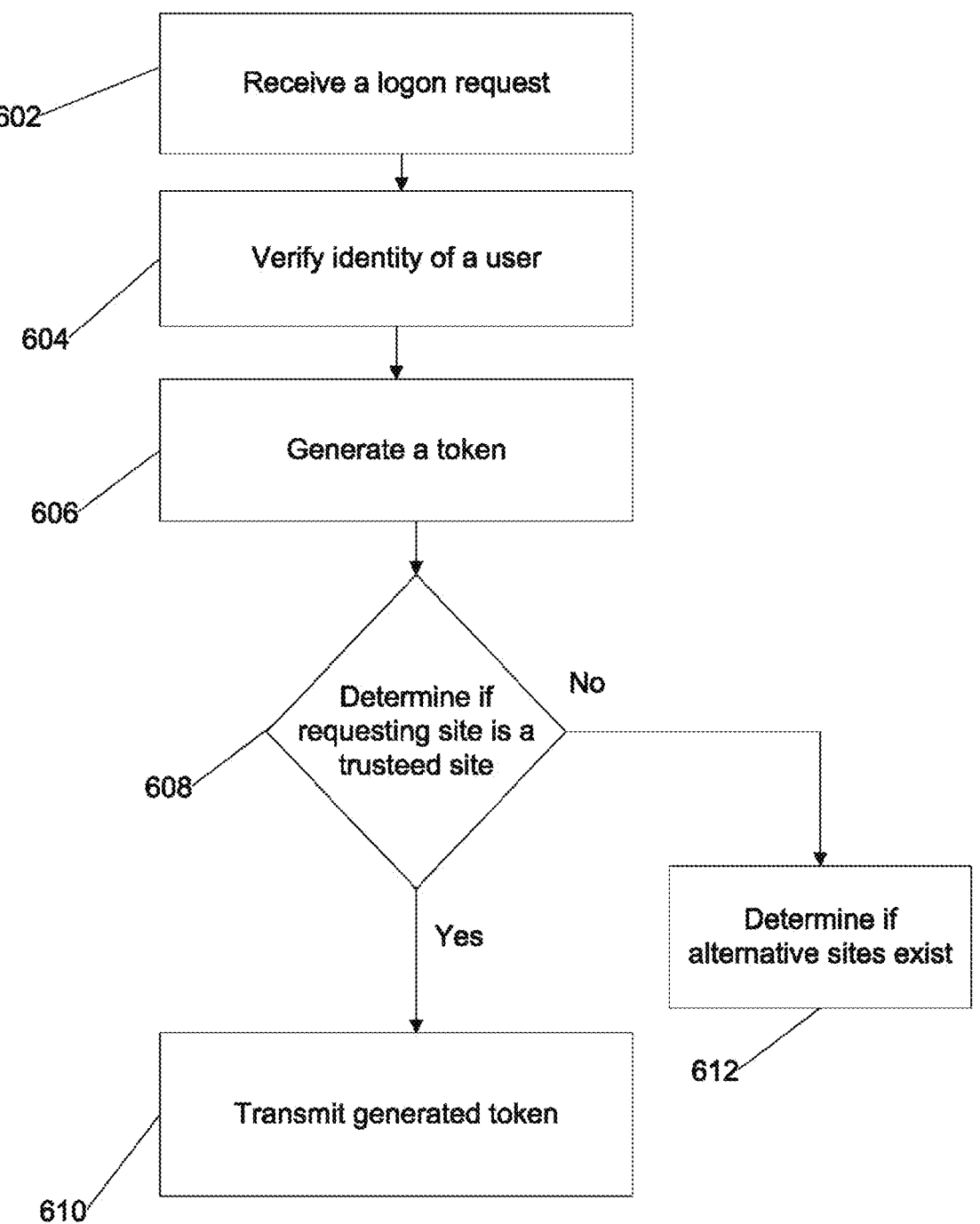
FIG. 6 illustrates an exemplary method for performing a trusted transaction between a user and a vendor in accordance with one or more aspects described herein.

FIG. 6 illustrates an exemplary method for performing a trusted transaction between a user and a vendor in accordance with one or more aspects described herein. In FIG. 6, cyber-security system 201 in step 602 receives a login request to perform a transaction between a user and a requesting site. In an embodiment, the logon request comprises a token request which is used to logon to the vendor website to complete the transaction. Cyber-security system 201 attempts to verify the identity of the user of the transaction om step 604. A token is generated in step 606 by cyber-security system 201 based on the received logon request. In step 608 cyber-security system 201 may determine if the requesting site is a trusted site. If the requesting site is a trusted site and the user identity has been verified, cyber-security system 201 transmits the generated token to the vendor in step 610. If cyber-security system 201 determines that the site is not a trusted site, cyber-security system 201 indicates the determination to the user and attempts to determine alternative sites for the user in step 612.

In an aspect of the disclosure, a search engine may collect information regarding which websites cyber-security system 201 has identified as verified vendor websites. Such information may be displayed in search results so that users may easily find the verified vendor websites.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. An apparatus comprising:
one or more processors;
a memory unit storing computer-executable instructions, which, when executed by the one or more processors, cause the apparatus to:
receive, from a user computing device, an authentication request to facilitate performance of a transaction between the user computing device and a computer-implemented service;
after receiving the authentication request, compare one or more privacy preferences associated with a user of the user computing device to one or more privacy policies of the computer-implemented service; and
after determining that a threshold number of the one or more privacy policies are incompatible with the one or more privacy preferences of the user, determine one or more alternative computer-implemented services for facilitating the transaction; and
communicate, to the user computing device, an indication of the one or more alternative computer-implemented services.

2. The apparatus of claim 1, wherein the computer-executable instructions, when executed by the one or more processors, further cause the apparatus to:
after communicating the indication of the one or more alternative computer-implemented services for completing the transaction, receive a second authentication request to perform the transaction between the user and an alternative computer-implemented service.

3. The apparatus of claim 2, wherein the computer-executable instructions, when executed by the one or more processors, further cause the apparatus to:

determine respective one or more authentication factors associated with respective one or more computer-implemented services, where the respective one or more computer-implemented services require the respective one or more authentication factors to be specified to facilitate communications with the respective one or more computer-implemented services; and select one or more of the respective one or more computer-implemented services as the one or more alternative computer-implemented services when a user profile associated with the user specifies the respective one or more authentication factors required by the respective one or more computer-implemented services.

4. The apparatus of claim 1, wherein the computer-executable instructions that cause the apparatus to determine the one or more alternative computer-implemented services for facilitating the transaction are further executable to cause the apparatus to:

retrieve, from storage, indications of the one or more alternative computer-implemented services, wherein the storage includes an association between the one or more privacy preferences of the user and the one or more alternative computer-implemented services.

5. The apparatus of claim 4, wherein the indication of the one or more alternative computer-implemented services comprises, for each of the one or more alternative computer-implemented services, an indication of a relative compatibility of a corresponding privacy policy with the one or more privacy preferences.

6. The apparatus of claim 5, wherein the indication of the relative compatibility comprises an indication associated with each of a plurality of privacy categories.

7. The apparatus of claim 6, wherein the plurality of privacy categories comprises a data collected category, a data sharing category, an opt-in/out category, and a data deletion category.

8. A non-transitory computer-readable medium having stored thereon computer-executable instructions, which, when executed by one or more processors of an apparatus, cause the apparatus to:

receive, from a user computing device, an authentication request to facilitate performance of a transaction between the user computing device and a computer-implemented service;

after receiving the authentication request, compare one or more privacy preferences associated with a user of the user computing device to one or more privacy policies of the computer-implemented service; and after determining that a threshold number of the one or more privacy policies are incompatible with the one or more privacy preferences of the user, determine one or more alternative computer-implemented services for facilitating the transaction; and communicate, to the user computing device, an indication of the one or more alternative computer-implemented services.

9. The non-transitory computer-readable medium of claim 8, wherein the computer-executable instructions are further executable to cause the apparatus to:

after communicating the indication of the one or more alternative computer-implemented services for completing the transaction, receive a second authentication request to perform the transaction between the user and an alternative computer-implemented service.

10. The non-transitory computer-readable medium of claim 9, wherein the computer-executable instructions are further executable to cause the apparatus to:

determine respective one or more authentication factors associated with respective one or more computer-implemented services, where the respective one or more computer-implemented services require the respective one or more authentication factors to be specified to facilitate communications with the respective one or more computer-implemented services; and select one or more of the respective one or more computer-implemented services as the one or more alternative computer-implemented services when a user profile associated with the user specifies the respective one or more authentication factors required by the respective one or more computer-implemented services.

11. The non-transitory computer-readable medium of claim 8, wherein computer-executable instructions that cause the apparatus to determine the one or more alternative computer-implemented services for facilitating the transaction are further executable to cause the apparatus to:

retrieve, from storage, indications of the one or more alternative computer-implemented services, wherein the storage includes an association between the one or more privacy preferences of the user and the one or more alternative computer-implemented services.

12. The non-transitory computer-readable medium of claim 11, wherein the indication of the one or more alternative computer-implemented services comprises, for each of the one or more alternative computer-implemented services, an indication of a relative compatibility of a corresponding privacy policy with the one or more privacy preferences.

13. The non-transitory computer-readable medium of claim 12, wherein the indication of the relative compatibility comprises an indication associated with each of a plurality of privacy categories.

14. The non-transitory computer-readable medium of claim 13, wherein the plurality of privacy categories comprises a data collected category, a data sharing category, an opt-in/out category, and a data deletion category.

15. A computer-implemented method comprising:

receiving, from a user computing device, an authentication request to facilitate performance of a transaction between the user computing device and a computer-implemented service;

after receiving the authentication request, comparing one or more privacy preferences associated with a user of the user computing device to one or more privacy policies of the computer-implemented service; and after determining that a threshold number of the one or more privacy policies are incompatible with the one or more privacy preferences of the user, determining one or more alternative computer-implemented services for facilitating the transaction; and communicating, to the user computing device, an indication of the one or more alternative computer-implemented services.

16. The computer-implemented method of claim 15, further comprising:

after communicating the indication of the one or more alternative computer-implemented services for completing the transaction, receiving a second authentication request to perform the transaction between the user and an alternative computer-implemented service.

17. The computer-implemented method of claim 16, further comprising:

determining respective one or more authentication factors associated with respective one or more computer-implemented services, where the respective one or more computer-implemented services require the respective one or more authentication factors to be specified to facilitate communications with the respective one or more computer-implemented services; and selecting one or more of the respective one or more computer-implemented services as the one or more alternative computer-implemented services when a user profile associated with the user specifies the respective one or more authentication factors required by the respective one or more computer-implemented services.

18. The computer-implemented method of claim 15, where determining the one or more alternative computer-implemented services for facilitating the transaction further comprises:

retrieving, from storage, indications of the one or more alternative computer-implemented services, wherein the storage includes an association between the one or more privacy preferences of the user and the one or more alternative computer-implemented services.

19. The computer-implemented method of claim 18, wherein the indication of the one or more alternative computer-implemented services comprises, for each of the one or more alternative computer-implemented services, an indication of a relative compatibility of a corresponding privacy policy with the one or more privacy preferences.

20. The computer-implemented method of claim 19, wherein the indication of the relative compatibility comprises an indication associated with each of a plurality of privacy categories.

* * * * *